UNITED STATES PATENT OFFICE.

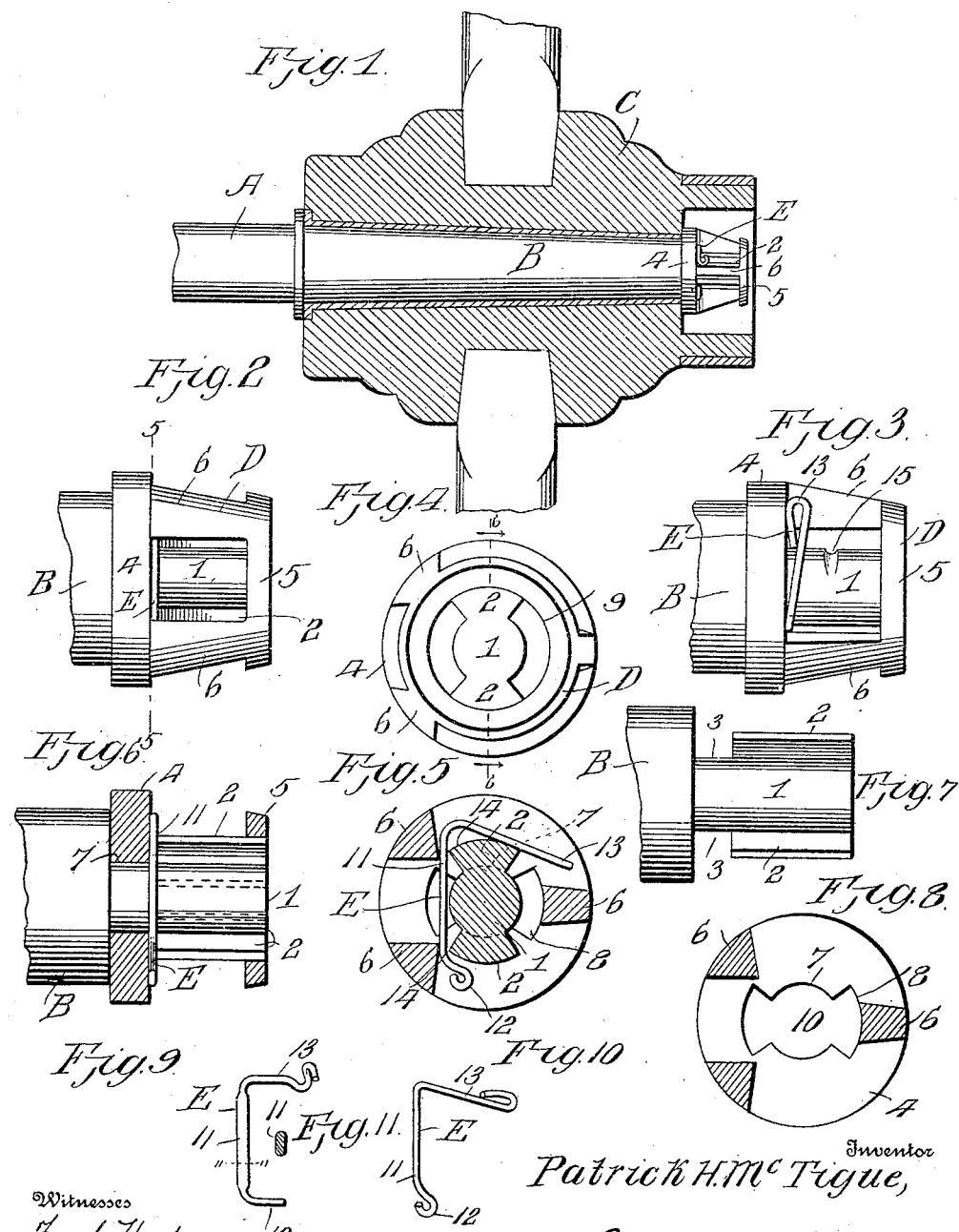

PATRICK H. McTIGUE, OF CHICAGO, ILLINOIS.

NUT-RETAINING DEVICE.

No. 884,196.   Specification of Letters Patent.   Patented April 7, 1908.

Application filed October 11, 1907. Serial No. 397,026.

*To all whom it may concern:*

Be it known that I, PATRICK H. McTIGUE, a citizen of the United States, residing at Chicago, in the county of Cook and State of Illinois, have invented new and useful Improvements in Nut-Retaining Devices, of which the following is a specification.

This invention relates to an axle or other nut-retaining device and has for one of its objects to improve and simplify the construction of devices of this character so as to be comparatively easy and inexpensive to manufacture, thoroughly reliable and effective in use, and composed of few parts.

A further object of the invention is the provision of a threadless nut for axle spindles and the like which is retained in position by means of a suitably-shaped key, whereby the nut can be applied or removed simply by the fingers and without the use of a wrench or other instrument.

A further object of the invention is the provision of a nut consisting of inner and outer spaced disks connected by cross bars, the disks being apertured to fit on a stud on the axle having dove-tail projections which coöperate to hold the nut in position and prevent it from sliding longitudinally off the stud.

A further object of the invention is the provision of a wire key adapted to be inserted between two of the cross bars of the nut and the stud of the shaft or axle so as to prevent turning of the nut on the axle.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a detail sectional view of the hub portion of a wheel showing the improved nut and retaining device applied thereto. Figs. 2 and 3 are elevations of the nut taken at right angles to each other. Fig. 4 is an end view of the nut. Fig. 5 is a sectional view on line 5—5, Fig. 2. Fig. 6 is a sectional view on line 6—6, Fig. 4. Fig. 7 is a side elevation of the extremity of the axle. Fig. 8 is a transverse section of the nut. Figs. 9 and 10 are perspective views of modified forms of the retaining device or key. Fig. 11 is a section on line 11—11, Fig. 9.

Similar reference characters are employed to designate corresponding parts throughout the several views.

In the present instance, I have elected to illustrate the invention as applied to a vehicle axle for holding a wheel in position thereon, but it is to be understood that the nut and retaining device may be employed in various other connections.

Referring to the drawing, A designates an axle provided with a spindle B on which rotates a wheel C. As shown in Fig. 7, the spindle B has a reduced portion or stud 1 that is provided with longitudinally extending ribs or projections 2 of dove-tail cross section and extending short of the end of the spindle B so as to provide recesses 3.

The nut D, which may be a metal casting or any other suitable structure, preferably consists of an inner disk 4 and an outer disk 5 spaced from the former and connected therewith by connecting or cross bars 6. The inner disk 4 has a central opening 7, Figs. 6 and 8, of the same diameter as the stud 1 and the wall of the opening is provided with dove-tail recesses 8 for accommodating the ribs or projections 2 on the stud 1. The outer disk has an opening 9, Fig. 4, which is of a diameter large enough to accommodate the projections 2. When the nut is in position on the axle, the recesses 8 do not register with the projections 2, so that the said projections will prevent longitudinal movement of the nut. In other words, the arcuate tongues or projections 10 of the disk 4, Fig. 8, will engage in the recesses 3, Fig. 7, and thereby prevent the nut from slipping off the stud.

By preventing relative turning of the nut after the same is locked in position by the projections 2, it will be impossible for the nut to work loose, and for this purpose a retaining device or key E is employed. This key preferably consists of a piece of wire or metal of suitable resiliency and is preferably bent into a shank portion 11 which has a short arm 12 and a long arm 13 extending from opposite ends and in the same general direction. Normally, the shank of the key extends between the stud of the axle and two of the cross bars of the nut, as shown in Fig. 5, and the short arm extends under one of the projections 2 while the long arm extends over the top projection of the stud, and the key may rest flat against the disk 4. By turning the key through ninety degrees, the arms 12 and 13 will aline with the space between the corners 14 of the projections 2 and adjacent cross bars 6, so that the key can be removed. After the key is removed, it is merely necessary to turn the nut to bring the recesses 8 into register with the projections 2, whereby the nut can be taken off longitudinally from the stud. Before turning the key into position for removal, it is preferable to press inwardly on the short arm 12 so that the long arm 13 can be swung outwardly over the outer rim or disk 5 of the nut. Otherwise, the disk would interfere with the removal of the key. To permit of ready insertion or removal of the key, it may be preferable to make it of flattened cross section as shown in Fig. 11, so that when the key is turned so that the arms 12 and 13 will aline with the spaces between the projections 2 and cross bars 6, the key can be readily passed in or out. When the key is in locking position, however, the sharp edges or corners 14 of the projections 2 will bite into the key and thus prevent slipping. As shown in Fig. 3, the stud 1 may be provided with a notch 15 for receiving the long arm of the key and thus coöperate with the sharp edges 14 of the projections to hold the key from turning.

In applying the nut to the axle, the nut is positioned so that the walls 8 will register with the projections on the axle stud 1 and the nut is moved inwardly until the disk 4 strikes the end of the axle. The nut is then turned through ninety degrees so that the disk 4 will engage behind the projections and the retaining key is next inserted by passing the smaller arm 12 inwardly between the projections 2 and adjacent cross bars 6, and when the lower end 12 passes under the bottom projection, the key is given a quarter turn so as to be locked in position. It will thus be seen that the nut can be readily applied or removed by the fingers and that the construction is comparatively simple and inexpensive.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. The combination of a member having radially extending projections, a nut applied to the member and having recesses for receiving the projections and locked in position by the latter when the nut is partially turned, and a retaining device applied to the nut and engaging both projections and having extremities disposed across the projections for preventing turning of the latter.

2. The combination of a member having outwardly extending projections, a nut having recesses for receiving the projections and intermediate tongues adapted to engage behind the projections, and a wire key applied to the nut and engaging the projections for preventing turning of the nut.

3. The combination of a nut comprising a disk having an aperture and recesses extending from the aperture, a second apertured disk, and connecting bars between the disks, with a member having projections adapted to enter the said recesses and adapted to engage the first-mentioned disk for holding the nut in position, and a locking key inserted between certain of the cross bars and projections of the member for preventing relative turning of the member and nut.

4. The combination of a nut comprising spaced disks having apertures, and cross bars connecting the disks, one of the disks having arcuate tongues at its aperture, with a member provided with projections adapted to engage the tongues for preventing the longitudinal movement of the nut and member, and a key inserted between the projections and certain of the cross bars for preventing relative turning of the nut and member, said key having arms disposed to prevent the insertion or removal of the key except when the latter is held in a definite position.

In testimony whereof, I affix my signature in presence of two witnesses.

PATRICK H. McTIGUE.

Witnesses:
BERNARD MURPHY,
FRED KRICKOW.